US007609698B2

(12) United States Patent
Choi et al.

(10) Patent No.: US 7,609,698 B2
(45) Date of Patent: Oct. 27, 2009

(54) APPARATUS AND METHOD FOR RETRANSMITTING DATA IN MOBILE COMMUNICATION SYSTEM

(75) Inventors: Sunghyun Choi, Seoul (KR); Sunggeun Jin, Seoul (KR); Youngkyu Choi, Seoul (KR); Kwanghun Han, Seoul (KR); Jae-Hyuk Jang, Seoul (KR); Yong-Hwan Lee, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 616 days.

(21) Appl. No.: 11/291,031

(22) Filed: Nov. 30, 2005

(65) Prior Publication Data

US 2006/0156162 A1   Jul. 13, 2006

(30) Foreign Application Priority Data

Nov. 30, 2004   (KR) .................. 10-2004-0099562

(51) Int. Cl.
*H04L 12/28* (2006.01)
*H04J 3/16* (2006.01)
*G08C 25/02* (2006.01)

(52) U.S. Cl. ............... 370/394; 370/466; 370/469; 714/748

(58) Field of Classification Search ........... 370/394, 370/466–469, 229; 714/748
See application file for complete search history.

(56) References Cited

U.S. PATENT DOCUMENTS 6,519,223 B1* 2/2003 Wager et al. ............... 370/216

| | | | |
|---|---|---|---|
| 6,687,248 B2* | 2/2004 | Jiang | 370/394 |
| 6,693,892 B1* | 2/2004 | Rinne et al. | 370/348 |
| 7,161,909 B2* | 1/2007 | Sharma | 370/235 |
| 2002/0041567 A1* | 4/2002 | Yi et al. | 370/236 |
| 2002/0090005 A1* | 7/2002 | Jiang et al. | 370/469 |
| 2002/0196760 A1* | 12/2002 | Malomsoky et al. | 370/338 |
| 2003/0007480 A1 | 1/2003 | Kim et al. | |
| 2003/0095519 A1* | 5/2003 | Kuo et al. | 370/338 |

(Continued)

FOREIGN PATENT DOCUMENTS

WO   WO 02/069547 A1   9/2002

(Continued)

OTHER PUBLICATIONS

Nuno T. Almeida et al., A Novel Approach to ARQ Error Control Mechanisms for Wireless LANs Communications, 2000 IEEE, pp. 22-31.

*Primary Examiner*—Seema S Rao
*Assistant Examiner*—Xavier Wong
(74) *Attorney, Agent, or Firm*—The Farrell Law Firm, LLP

(57) ABSTRACT

In retransmitting data at high speed by a PHY layer in a mobile communication system, when data to be transmitted to the receiver is received from the MAC layer of the transmitter, the PHY layer of the transmitter transmits the data to the PHY layer of the receiver, receives first information representing normal reception or abnormal reception of the data from the PHY layer of the receiver, notifies the MAC layer of the transmitter of the normal reception of the data when the first information represents the normal reception, and retransmits the data to the PHY layer of the receiver when the first information represents the abnormal reception.

10 Claims, 8 Drawing Sheets

U.S. PATENT DOCUMENTS

| | | | | |
|---|---|---|---|---|
| 2003/0147396 A1* | 8/2003 | Jiang | | 370/394 |
| 2003/0152058 A1* | 8/2003 | Cimini et al. | | 370/338 |
| 2003/0202501 A1* | 10/2003 | Jang | | 370/346 |
| 2004/0103278 A1* | 5/2004 | Abhishek et al. | | 713/160 |
| 2004/0184437 A1* | 9/2004 | Lee et al. | | 370/349 |
| 2005/0226222 A1* | 10/2005 | Qian | | 370/352 |

FOREIGN PATENT DOCUMENTS

| | | |
|---|---|---|
| WO | WO 02/096006 A2 | 11/2002 |

\* cited by examiner

APPARATUS AND METHOD FOR RETRANSMITTING DATA IN MOBILE COMMUNICATION SYSTEM

PRIORITY

This application claims priority to an application filed in the Korean Intellectual Property Office on Nov. 30, 2004 and assigned Serial No. 2004-99562, the contents of which are incorporated herein by reference.

BACKGROUND OF THE INVENTION

1. Field of the Invention

The present invention relates to an apparatus and a method for retransmitting data by in a mobile communication system.

2. Description of the Related Art

With the general development of communication technology, mobile communication systems are evolving into communication systems capable of performing high speed data transmission. With the development of the mobile communication systems, various schemes, such as Hybrid Automatic Retransmission reQuest (HARQ) schemes, Adaptive Modulation and Coding (AMC) schemes, etc., have been proposed in order to enable high speed data transmission to be performed and increase the efficiency of resources.

Hereinafter, the HARQ scheme, specifically, an n-channel Stop And Wait (SAW) HARQ scheme, will be described. The n-channel SAW HARQ scheme introduces the following two designs in order to improve the efficiency of a conventional SAW ARQ scheme.

The first scheme is a soft combining scheme. The soft combining scheme is a scheme in which a receiver-side temporarily stores in a soft buffer data having an error, and combines the stored data with the retransmission portion of corresponding data, thereby reducing error occurrence probability. The soft combining scheme includes two schemes, i.e., a Chase Combining (CC) scheme and an Incremental Redundancy (IR) scheme.

When the CC scheme is used, a transmitter-side uses data of the same format in initial transmission and retransmission. That is, in a case in which the CC scheme is used, if m symbols have been transmitted to one coded block in initial transmission, the same number of m symbols are transmitted to one coded block in retransmission as well. The coded block represents user data transmitted during one Transmit Time Interval (TTI). When the CC scheme is used, the same coding rate is applied to the initial transmission and retransmission. Accordingly, the receiver-side combines the initially transmitted coded block with the retransmitted coded block, performs a Cyclic Redundancy Check (CRC) operation by means of the combined coded block, and confirms if an error has occurred according to the results obtained by performing the CRC operation.

When the IR scheme is used, the transmitter-side uses data of different formats in the initial transmission and retransmission. For example, when n bits of user data have been generated as m symbols via channel coding, the transmitter-side transmits only some of the m symbols in the initial transmission, and sequentially transmits the other symbols, excluding the symbols transmitted in the initial transmission, in the retransmission. That is, when the IR scheme is used, a coding rate in the initial transmission is different from that in the retransmission. Accordingly, the receiver-side concatenates the retransmitted coded blocks to the rear portion of the initially transmitted coded block so as to form a coded block having a high coding rate, and performs an error correction.

When the IR scheme is used, a version number is used in order to distinguish the coded block transmitted in the initial transmission from the coded blocks transmitted in the retransmission. For example, a version number 1 is assigned to the coded block transmitted in the initial transmission, a version number 2 is assigned to the coded block transmitted in the retransmission, and a version number 3 is assigned to the coded block transmitted in the next retransmission. Accordingly, the receiver-side may combine the initially transmitted coded block with the retransmitted coded blocks by using the version number.

The second scheme for improving the efficiency of the n-channel SAW HARQ scheme is an HARQ scheme. In the case of the conventional SAW ARQ scheme, the transmitter-side transmits next data only when receiving Acknowledgement (ACK) information for the previously transmitted data. Because the transmitter-side transmits the next data only after receiving the ACK information for the previous data, a case may occur in which the transmitter-side must wait for the ACK information even though the transmitter-side can currently transmit data. Different from the conventional SAW ARQ scheme, the n-channel SAW HARQ scheme is a scheme capable of continuously transmitting multiple data even without receiving the ACK information for the previously transmitted data, thereby improving the efficient use of a radio link. That is, when the n-channel SAW HARQ scheme is used, n logical channels are established between a transmitter and a receiver, and the n logical channels are distinguished by specific time or expressed channel numbers, so that the receiver can determine which data a packet received in a random point in time belongs. Accordingly, the receiver can perform a necessary operation, e.g., the receiver can reconstruct data according to a sequence in which the data must be received, can soft-combine corresponding data, etc.

With the development of mobile communication systems, a structure in which different layers may perform functions performed by each layer has started to be introduced in a protocol stack for the improvement of the optimization and throughput. That is, a Medium Access Control (MAC) layer has generally performed the data retransmission function according to the ARQ scheme. Currently, a Physical (PHY) layer has also performed the data retransmission function according to the HARQ scheme. In other words, different layers have independently performed nearly identical functions.

FIG. 1 is a diagram illustrating a general data retransmission operation according to the ARQ scheme and the HARQ scheme in a mobile communication system.

Referring to FIG. 1, a protocol stack of a transmitter has a structure of a PHY layer 110 and an MAC layer 120. Likewise, a protocol stack of a receiver also has a structure of a PHY layer 130 and an MAC layer 140. FIG. 1 illustrates only the PHY layers and the MAC layers in the protocol stack structures of the transmitter and the receiver in order to describe the ARQ scheme and the HARQ scheme. However, it is apparent to those skilled in the art that other layers may exist in addition to the PHY layer and the MAC layer. The data retransmission function according to the HARQ scheme is performed between the PHY layer 110 of the transmitter and the PHY layer 130 of the receiver. The data retransmission function according to the ARQ scheme is performed between the MAC layer 120 of the transmitter and the MAC layer 140 of the receiver.

When an error occurs in the data (i.e., MAC Protocol Data Unit (MPDU)) transmitted to the MAC layer 140 of the receiver from the MAC layer 120 of the transmitter, the MAC layer 140 of the receiver transmits a retransmission request (i.e., Non-Acknowledgement (NACK) information) of the MPDU, which has been transmitted from the MAC layer 120 of the transmitter, to the MAC layer 120 of the transmitter. Then, the MAC layer 120 of the transmitter retransmits the MPDU for which the retransmission has been requested to the MAC layer 140 of the receiver. The NACK information may be defined as a primitive form.

Further, when an error occurs in data (i.e., Physical Protocol Data Unit (PPDU)) transmitted to the PHY layer 130 of the receiver from the PHY layer 110 of the transmitter, the PHY layer 130 of the receiver transmits a retransmission request (i.e., NACK information) of the PPDU, which has been transmitted from the PHY layer 110 of the transmitter, to the PHY layer 110 of the transmitter. Then, the PHY layer 110 of the transmitter retransmits the PPDU for which the retransmission has been requested to the PHY layer 130 of the receiver.

As described in FIG. 1, the MAC layer and the PHY layer independently perform the data retransmission functions according to the ARQ scheme and the HARQ scheme, respectively. That is, because the MAC layer performs the retransmission function according to the ARQ scheme for actually the same data, it is necessary to continuously transmit/receive a primitive representing the ACK information and the NACK information. Therefore, the signaling load may increase. Further, when the primitive is transmitted/received, delay time in the signaling may occur. Therefore, the entire performance of the mobile communication system may deteriorate. In addition, the PHY layer also performs the retransmission function according to the HARQ scheme for the same data, so that redundant transmission of unnecessary data may occur.

Accordingly, it is necessary to provide a new data retransmission scheme capable of not only minimizing the signaling load and the delay time, but also preventing redundant transmission of unnecessary data.

SUMMARY OF THE INVENTION

In retransmitting data at high speed by a PHY layer in a mobile communication system, when data to be transmitted to the receiver is received from the MAC layer of the transmitter, the PHY layer of the transmitter transmits the data to the PHY layer of the receiver, receives first information representing normal reception or abnormal reception of the data from the PHY layer of the receiver, notifies the MAC layer of the transmitter of the normal reception of the data when the first information represents the normal reception, and retransmits the data to the PHY layer of the receiver when the first information represents the abnormal reception.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. In the following description, a detailed description of known functions and configurations incorporated herein will be omitted when it may obscure the subject matter of the present invention.

The present invention proposes an apparatus and a method for integrating data retransmission functions of a Medium Access Control (MAC) layer and a Physical (PHY) layer, and retransmitting data at high speed in a mobile communication system. The present invention proposes a data retransmission function according to a Fast Automatic Retransmission reQuest (FARQ) scheme obtained by integrating a data retransmission function according to an ARQ scheme between MAC layers with a data retransmission function according to an HARQ scheme between PHY layers, thereby minimizing signaling load, preventing time delay from occurring, and preventing the redundant transmission of unnecessary data.

Before describing a data retransmission operation according to the FARQ scheme, formats of data newly proposed by the present invention and transmitted/received between layers, i.e., formats of a MAC Service Data Unit (MSDU), a MAC Protocol Data Unit (MPDU), and a Physical Protocol Data Unit (PPDU), will be described.

Figure 1:
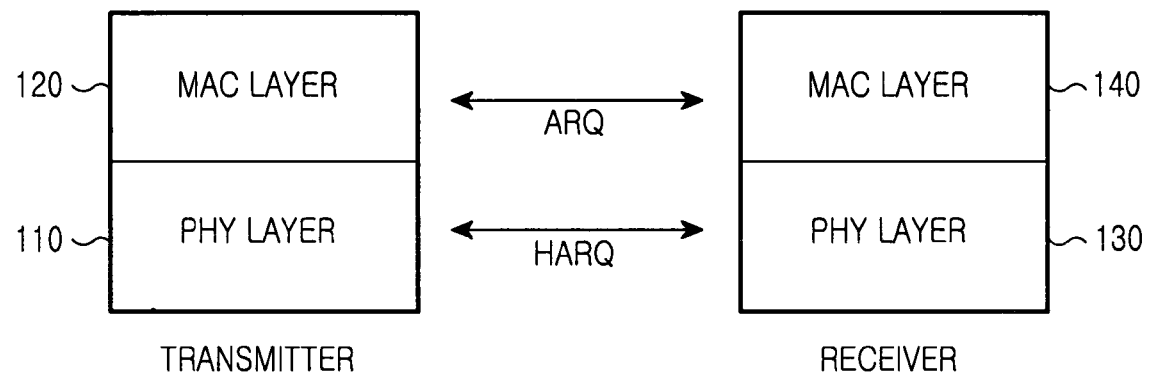
FIG. 1 is a diagram illustrating a general data retransmission operation according to an ARQ scheme and an HARQ scheme in a mobile communication system.
Figure 2:
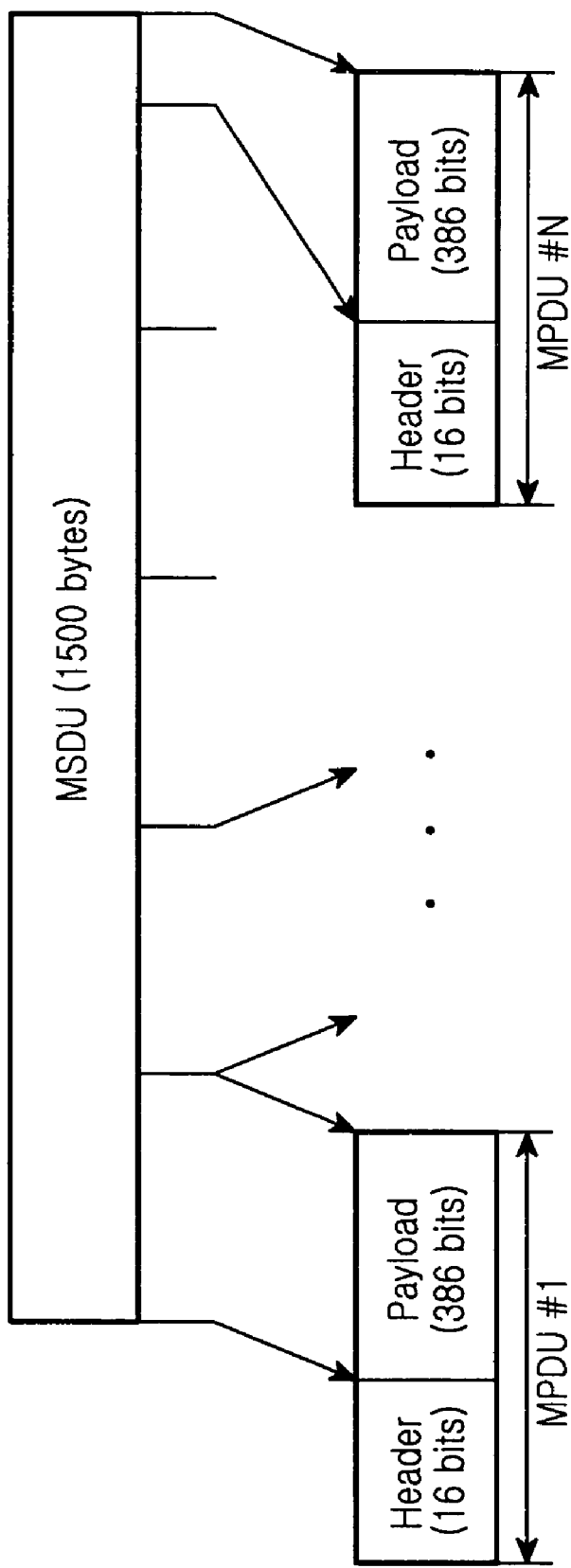
FIG. 2 is a diagram illustrating the format of an MSDU according to an embodiment of the present invention.

FIG. 2 is a diagram illustrating the format of the MSDU according to an embodiment of the present invention.

Referring to FIG. 2, the MSDU has a maximum size of 1500 bytes, and is fragmented into a plurality of MPDUs, e.g., N MPDUs, i.e., MPDU #1 to MPDU #N. Each of the MPDUs has a header field and a payload field. For example, the header field has a size of 16 bits and the payload field has a size of 368 bits. An upper layer fragments a generated SDU according to the size of the MSDU and transfers the fragmented SDU to the MAC layer. When the SDU is a size less than that of the MSDU, the SDU is format-converted to the MSDU and transferred to the MAC layer.

Figure 3:
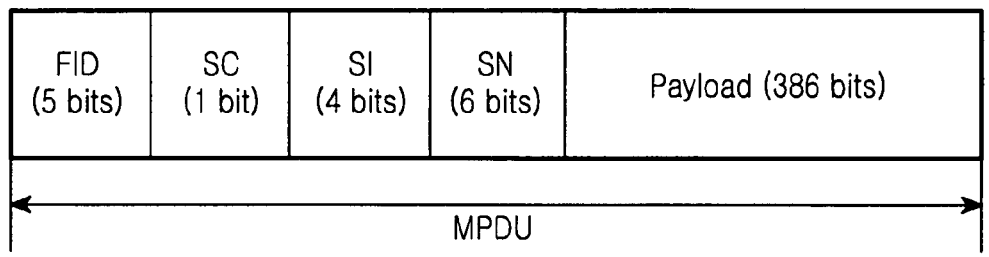
FIG. 3 is a diagram illustrating the format of an MPDU according to an embodiment of the present invention.

FIG. 3 is a diagram illustrating the format of the MPDU according to the embodiment of the present invention.

Referring to FIG. 3, the MPDU includes the header field and the payload field as described in FIG. 2. The header field includes a Flow Identifier (FID) field, a Sequence Control (SC) field, an SDU Index (SI) field, and an Sequence Number (SN) field. For example, the FID field has a size of 5 bits and represents an FID of a service flow; the SC field has a size of 1 bit and represents if a corresponding MSDU is the last MPDU of the fragmented MPDUs; the SI field has a size of 4 bits and represents the index of the MSDU fragmented into the MPDU; and, the SN field has a size of 6 bits and represents an SN of the MPDU.

As an example, when 1 is recorded in the SC field, it represents that the current MPDU is the last MPDU of the MPDUs into which the corresponding MSDU has been fragmented. However, when 0 is recorded in the SC field, it represents that the current MPDU is not the last MPDU of the MPDUs into which the corresponding MSDU has been fragmented. Further, the SI field has a value from 0 to $2^4-1$ because the index of the SDU has a value from 0 to $2^4-1$. One transmission/reception window is generated per flow, and a maximum of $2^4-1$ number of MSDUs may be simultaneously processed per flow. The transmission/reception window is not managed by the byte, but rather is managed by the number of MSDUs. The transmission/reception window may have a size set to a value within the range as expressed by Equation 1 below.

$$1 \times (\text{max size of an MSDU}(1500 \text{ bytes})) \text{bytes} \sim (2^4-1 \times 1500) \text{bytes} \quad (1)$$

The SN field has a value from 0 to $2^6-1$ because the SDU is fragmented by the number corresponding to a value from 0 to $2^6-1$. That is, whenever a new MSDU is transferred from an upper layer to the MAC layer and fragmented, the SN value is reset and reset for the newly transferred MSDU.

Figure 4:
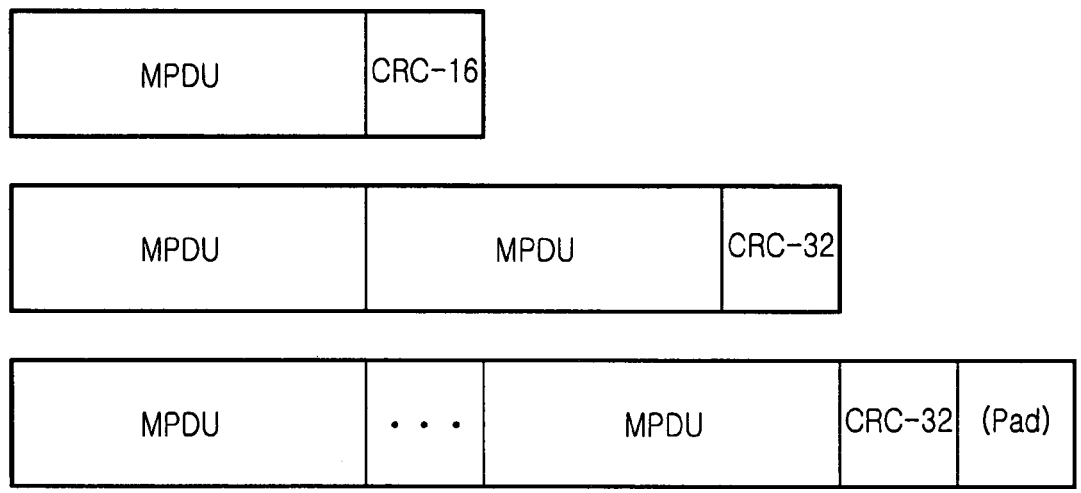
FIG. 4 is a diagram illustrating the format of an PPDU according to an embodiment of the present invention.

FIG. 4 is a diagram illustrating the format of the PPDU according to the embodiment of the present invention.

Referring to FIG. 4, the PPDU is generated by multiplexing a plurality of MPDUs. That is, a MAC layer determines the number of MPDUs, which is to be generated as the PPDU, based on an Adaptive Modulation and Coding (AMC) set according to the application of an AMC scheme between a transmitter and a receiver, i.e., Modulation and Coding Scheme (MCS) levels or a scheduling algorithm. Then, the MAC layer transfers to the PHY layer the MPDUs corresponding to the determined number. The PHY layer multiplexes the MPDUs transferred from the MAC layer, thereby generating one PPDU.

Figure 5:
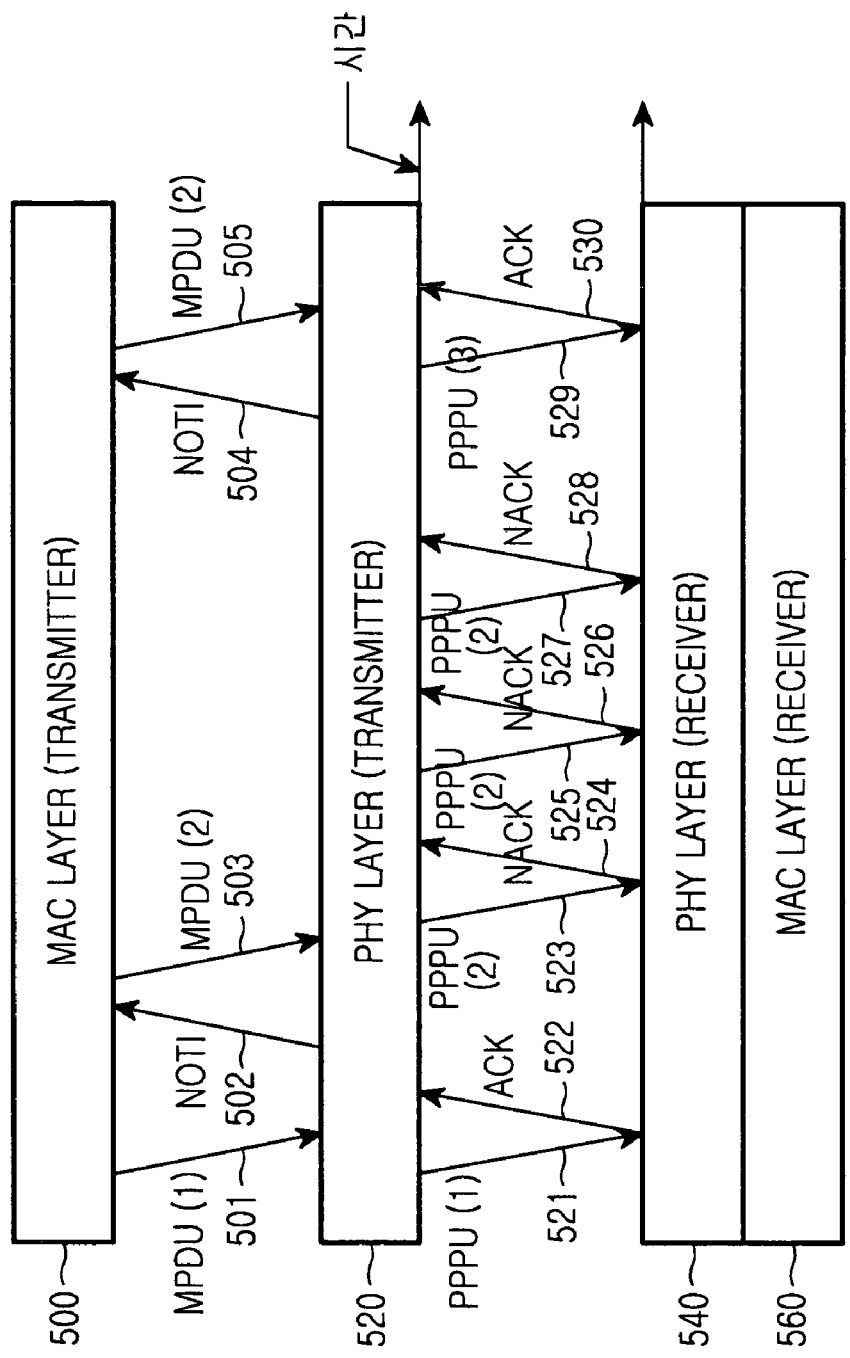
FIG. 5 is a diagram illustrating an interlayer data retransmission operation based on an FARQ scheme in a mobile communication system according to an embodiment of the present invention.

FIG. 5 is a diagram illustrating an interlayer data retransmission operation based on a FARQ scheme in a mobile communication system according to the embodiment of the present invention.

Referring to FIG. 5, the protocol stack of a transmitter has a structure of a PHY layer 520 and a MAC layer 500. Likewise, a protocol stack of a receiver has a structure of a PHY layer 540 and a MAC layer 560. FIG. 5 illustrates only the PHY layers and the MAC layers in the protocol stack structures of the transmitter and the receiver in order to describe the FARQ scheme. However, it will be apparent to those skilled in the art that other layers may exist in addition to the PHY layer and the MAC layer. In a general mobile communication system, the data retransmission function according to the HARQ scheme is performed between the PHY layer 520 of the transmitter and the PHY layer 540 of the receiver, and the data retransmission function according to the ARQ scheme is performed between the MAC layer 500 of the transmitter and the MAC layer 560 of the receiver. However, in the mobile communication system according to an embodiment of the present invention, the data retransmission function according to the ARQ scheme and the data retransmission function according to the HARQ scheme are not separately performed in each layer, but rather the data retransmission function according to both the ARQ and HARQ schemes is performed between the PHY layer 520 of the transmitter and the PHY layer 540 of the receiver. That is, the PHY layer 520 of the transmitter transfers to the MAC layer 500 of the transmitter Acknowledgement (ACK) information and Non-Acknowledgement (NACK) information, which are based on the data retransmission function according to the HARQ scheme, between the PHY layer 520 of the transmitter and the PHY layer 540 of the receiver, thereby performing a data retransmission operation according to the FARQ scheme which enables high speed data retransmission to be implemented.

The MAC layer 500 of the transmitter receives an MSDU from an upper layer, converts the MSDU into an MPDU (MPDU (1)), and transfers the MPDU (1) to the PHY layer 520 of the transmitter (501). The MSDU has a size different from that of the MPDU, but it is assumed that one MSDU is the same size as the MPDU for convenience of description. The MSDU has a maximum size of 1500 bytes as described in FIG. 2. When a generated SDU has a size greater than 1500 bytes, the upper layer generates a plurality of MSDUs by fragmenting the SDU, and transfers the MSDUs to the MAC layer 500 of the transmitter. Since an operation for converting the MSDU to the MPDU has no direct connection to the present invention, a detailed description will be omitted. Further, the term MPDU (n) represents an MPDU having an SN of n.

The PHY layer 520 of the transmitter converts the MPDU (1) received from the MAC layer 500 of the transmitter to a PPDU (PPDU (1)), and transmits the PPDU (1) to the PHY layer 540 of the receiver (521). Since an operation for converting the MPDU to the PPDU has no direct connection to the present invention, a detailed description will be omitted. Further, the term PPDU (n) represents a PPDU having an SN of n. The MPDU has a size different from that of the PPDU, but it is assumed that one MPDU is the same size as the PPDU for convenience of description.

The PHY layer 540 of the receiver receives the PPDU (1) from the PHY layer 520 of the transmitter, and determines if an error has occurred in the PPDU (1) through a Cyclic Redundancy Check (CRC) operation, etc. As a result of the determination, when the error has not occurred in the received PPDU (1), the PHY layer 540 of the receiver transmits ACK information to the PHY layer 520 of the transmitter (522). Then, the PHY layer 520 of the transmitter confirms the normal reception of the PPDU (1) based on the ACK information received from the PHY layer 540 of the receiver. Because the MPDU (1) corresponding to the PPDU (1) has been normally received in the receiver, the PHY layer 520 of the transmitter notifies (NOTI) the MAC layer 500 of the transmitter of the normal reception (502).

The MAC layer 500 of the transmitter having received the notification representing the normal reception of the MPDU (1) transfers next data, i.e., an MPDU (2), to the PHY layer 520 of the transmitter (503). Then, the PHY layer 520 of the transmitter converts the MPDU (2) received from the MAC layer 500 of the transmitter to a PPDU (PPDU (2)), and transmits the PPDU (2) to the PHY layer 540 of the receiver (523).

The PHY layer 540 of the receiver receives the PPDU (2) from the PHY layer 520 of the transmitter, and determines if an error has occurred in the PPDU (2) through the CRC operation, etc. As a result of the determination, when the error has occurred in the received PPDU (2), the PHY layer 540 of the receiver transmits NACK information to the PHY layer 520 of the transmitter (524). Then, the PHY layer 520 of the transmitter confirms the abnormal reception of the PPDU (2) based on the NACK information received from the PHY layer 540 of the receiver, and retransmits the PPDU (2) to the PHY layer 540 of the receiver (525). The soft combining scheme used in the HARQ scheme may be classified into a Chase Combining (CC) scheme, an Incremental Redundancy (IR) scheme, etc. The retransmission form of the PPDU may be determined according to a soft combining scheme preset in the mobile communication system.

The PHY layer 540 of the receiver receives the PPDU (2) retransmitted from the PHY layer 520 of the transmitter, and determines if an error has occurred in the received PPDU (2) through the CRC operation, etc. Herein, the PHY layer 540 of the receiver soft-combines the initially received PPDU (2) with the PPDU (2) received later, and then determines if the error has occurred in the received PPDU (2). As a result of the determination, when the error has occurred in the received PPDU (2), the PHY layer 540 of the receiver transmits NACK information to the PHY layer 520 of the transmitter (526). Then, the PHY layer 520 of the transmitter confirms the abnormal reception of the PPDU (2) based on the NACK information received from the PHY layer 540 of the receiver, and retransmits the PPDU (2) to the PHY layer 540 of the receiver (527).

The PHY layer 540 of the receiver receives the PPDU (2) retransmitted from the PHY layer 520 of the transmitter, and determines if an error has occurred in the received PPDU (2) through the CRC operation, etc. As a result of the determination, when the error has occurred in the received PPDU (2), the PHY layer 540 of the receiver transmits NACK information to the PHY layer 520 of the transmitter (528). Then, the PHY layer 520 of the transmitter confirms the abnormal reception of the PPDU (2) based on the NACK information received from the PHY layer 540 of the receiver. For example, when a preset number of retransmissions is 2 in the mobile communication system using the HARQ scheme, the actual number of retransmissions exceeds the preset number of retransmissions. Accordingly, the PHY layer 520 of the transmitter determines that the PHY layer 520 has failed to transmit the PPDU (2), and notifies the MAC layer 500 of the abnormal reception of the MPDU (2) corresponding to the PPDU (2) (504). In FIG. 5, retransmission of the HARQ scheme is controlled according to the number of retransmissions. Further, even when retransmission does not succeed within a preset period of time in addition to the number of retransmissions, it may also be determined as transmission failure.

The MAC layer 500 of the transmitter having received the notification representing the abnormal reception of the MPDU (2) retransfers the MPDU (2) to the PHY layer 520 of the transmitter (505). Then, the PHY layer 520 of the transmitter converts the MPDU (2) received from the MAC layer 500 of the transmitter to a PPDU (PPDU (3)), and transmits the PPDU (3) to the PHY layer 540 of the receiver (529).

The PHY layer 540 of the receiver receives the PPDU (3) from the PHY layer 520 of the transmitter, and determines if an error has occurred in the PPDU (3) through the CRC operation, etc. When the error has not occurred in the received PPDU (3), the PHY layer 540 of the receiver transmits ACK information to the PHY layer 520 of the transmitter (530). Then, the PHY layer 520 of the transmitter confirms the normal reception of the PPDU (3) based on the ACK information received from the PHY layer 540 of the receiver.

As described above, when the FARQ scheme proposed by the present invention is used, only the PHY layer performs the data retransmission and the ACK/NACK information transmission/reception between the transmitter and the receiver while the MAC layer does not perform the data retransmission and the ACK/NACK information transmission/reception between the transmitter and the receiver. Consequently, it is possible to perform high speed data retransmission and prevent unnecessary data retransmission.

Figure 6:
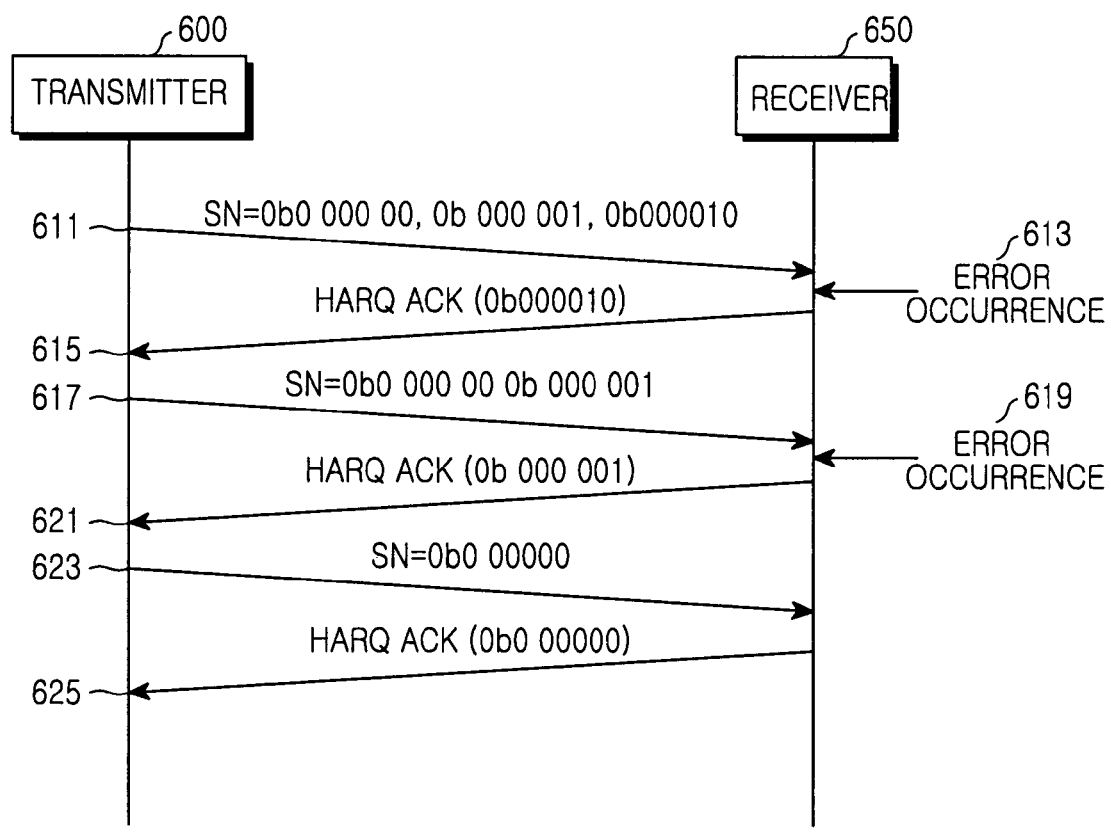
FIG. 6 is a flow diagram illustrating a data retransmission process between a transmitter and a receiver based on an FARQ scheme in a mobile communication system according to an embodiment of the present invention.

FIG. 6 is a flow diagram illustrating a data retransmission process between the transmitter and the receiver based on the FARQ scheme in the mobile communication system according to the embodiment of the present invention.

Referring to FIG. 6, the transmitter 600 transmits to the receiver 650 three data blocks (i.e., PPDUs) having SNs of 0b000000, 0b000001 and 0b000010 (611). The receiver 650 determines if an error has occurred in the three received PPDUs through the CRC operation, etc. As a result of the determination, when the error has occurred in the PPDUs having the SNs of 0b000000 and 0b000001 excluding the PPDU having the SN of 0b000010 (613), the receiver 650 transmits ACK information (i.e., HARQ ACK information) representing the normal reception of only the PPDU having the SN of 0b000010 to the transmitter 600 (615). Of course, the receiver 650 transmits NACK information (i.e., HARQ NACK information) to the transmitter 600, which represents that the receiver 650 have not normally received the PPDUs having the SNs of 0b000000 and 0b000001.

After the transmitter 600 has been notified that the receiver 650 have normally received only the PPDU having the SN of 0b000010, the transmitter 600 retransmits to the receiver 650 the PPDUs having the SNs of 0b000000 and 0b000001 (617). The receiver 650 determines if an error has occurred in the two received PPDUs through the CRC operation, etc. When the error has occurred in the PPDU having the SN of 0b000000 excluding the PPDU having the SN of 0b000001 (619), the receiver 650 transmits to the transmitter 600 ACK information (i.e., HARQ ACK information) representing the normal reception of only the PPDU having the SN of 0b000001 (621). Of course, the receiver 650 transmits NACK information (i.e., HARQ NACK information) to the transmitter 600, which represents that the receiver 650 have not normally received the PPDU having the SN of 0b000000.

After the transmitter 600 has been notified that the receiver 650 have normally received only the PPDU having the SN of 0b000001, the transmitter 600 retransmits the PPDU having the SN of 0b000000 (623). The receiver 650 determines if an error has occurred in the received PPDU through the CRC operation, etc. When the error has not occurred in the PPDU having the SN of 0b000000, the receiver 650 transmits to the transmitter 600 ACK information (i.e., HARQ ACK information) representing the normal reception of the PPDU having the SN of 0b000000 (625).

As described above, when the HARQ scheme according to the embodiment of the present invention is used, the HARQ scheme between the PHY layers is used while the ARQ scheme between the MAC layers is not used for the data transmission/reception between the transmitter and the receiver. Consequently, it is possible to perform high speed data retransmission and prevent unnecessary data retransmission.

Hereinafter, a window management operation between the transmitter and the receiver when a data retransmission operation is performed by using the FARQ scheme according to the embodiment of the present invention will be described with reference to FIGS. 7 and 8.

Figure 7:
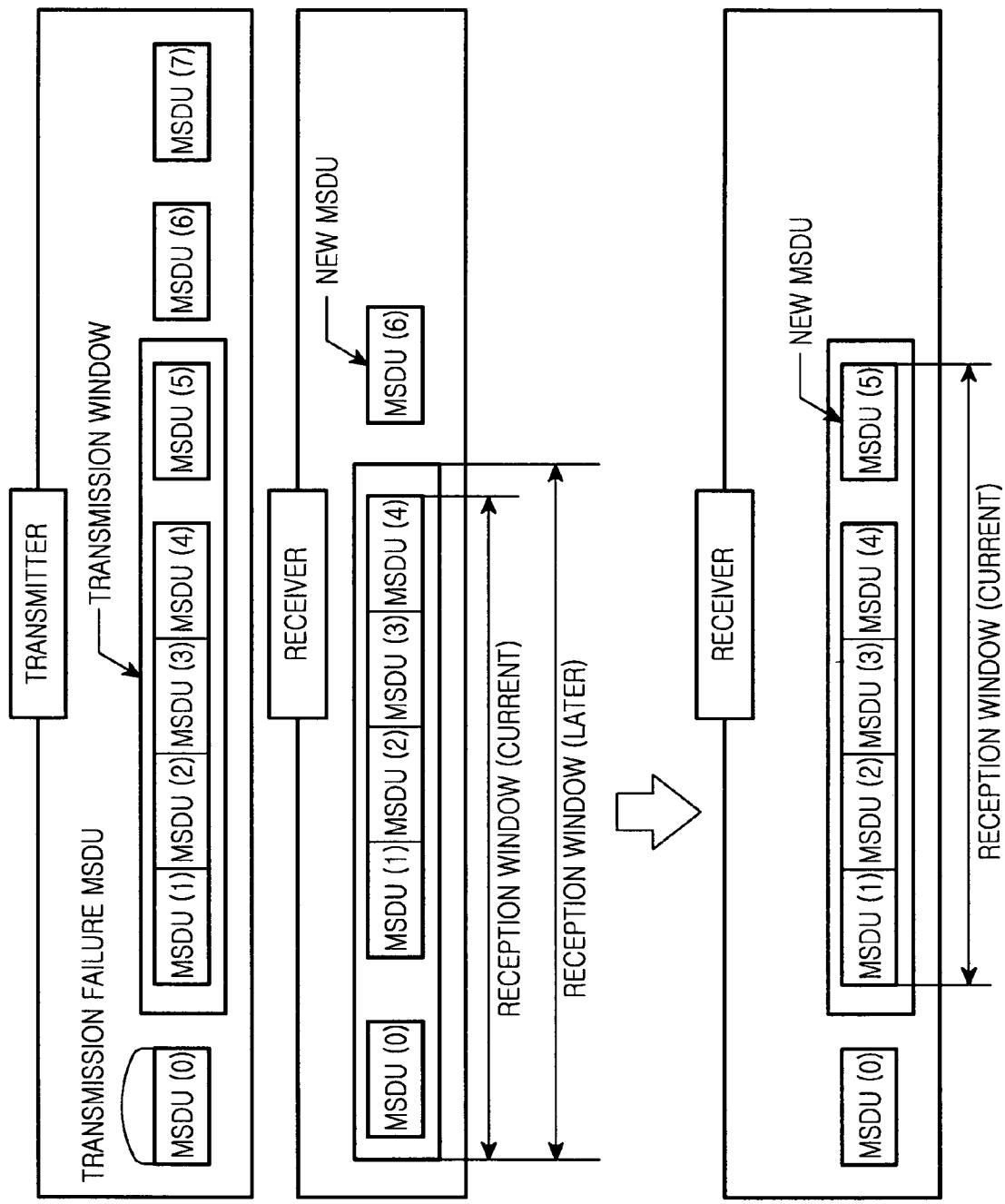
FIG. 7 is a diagram illustrating an operation for managing windows of a transmitter and a receiver based on a first window management scheme in a data retransmission operation using an FARQ scheme according to an embodiment of the present invention.
Figure 8:
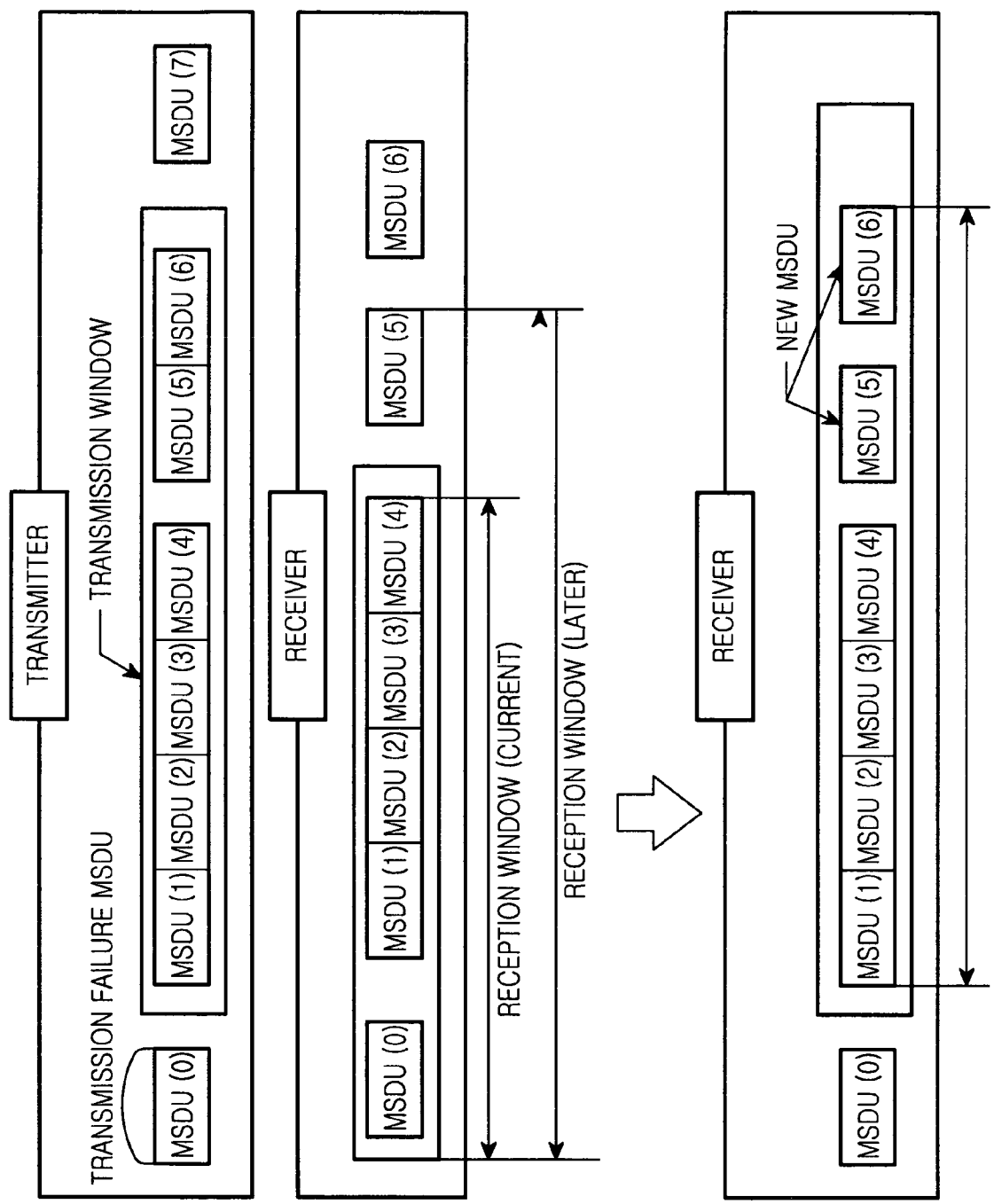
FIG. 8 is a diagram illustrating an operation for managing windows of a transmitter and a receiver based on a second window management scheme in a data retransmission operation using an FARQ scheme according to an embodiment of the present invention.

Before describing FIGS. 7 and 8, in the data retransmission operation using the FARQ scheme according to the embodiment of the present invention, the window management between the transmitter and the receiver becomes more important for exact data transmission/reception because the data retransmission operation according to the ARQ scheme is not performed between the MAC layers of the transmitter and the receiver. That is, it is necessary to acquire synchronization of currently transmitted/received data through the window management. Accordingly, only when the window management is precisely performed, it is possible to harmonize synchronization of data transmission/reception mutually managed by the transmitter and the receiver.

FIG. 7 is a diagram illustrating an operation for managing windows of the transmitter and the receiver based on a first window management scheme in the data retransmission operation using the FARQ scheme according to an embodiment of the present invention.

Referring to FIG. 7, when the first window management scheme is used, the number of MSDUs managed by the transmission window of the transmitter and the number of MPDUs managed by the reception window of the receiver are always constant. However, because the size of the MSDU changes according to situations, the sizes of the transmission window and the reception window may change according to the size of the MSDU even though each of the transmission window and the reception window manages the constant number of MSDUs.

In FIG. 7, it is assumed that each of the transmission window and the reception window manages five MSDUs. After the transmitter transmits to the receiver an MSDU (0) to an MSDU (4), when the MSDU (0) is not normally received in the receiver while the transmission window manages the MSDU (0) to the MSDU (4), the transmitter stops transmission of the MSDU (0) and moves the transmission window. Then, when the transmitter transmits an MSDU (5) after stopping the transmission of the MSDU (0), the transmission window manages MSDU (1) to MSDU (5).

In this case, the receiver cannot completely understand the fact that the transmission has moved the transmission window. Therefore, when the transmitter transmits the MSDU (5) after stopping the transmission of the MSDU (0) while the reception window manages MSDU (0) to MSDU (4), the receiver stops reception of the MSDU (0) having the smallest SN in order to manage MSDU (5) received from the transmitter because the receiver can manage maximum five MSDUs within the reception window. Accordingly, the receiver moves the reception window due to the stop of reception of MSDU (0). Therefore, the reception window includes MSDU (1) to MSDU (5).

The reason that each of the transmission window and the reception window can always manage a constant number of MSDUs is because the MSDU can be distinguished through the SI field of the MPDU, and boundaries between MSDUs can be distinguished through the SC field of the MPDU as described above.

Hereinafter, the maximum number of MSDUs which may be managed by each of the transmission window and the reception window will be described.

First, it is assumed that the number of MSDUs managed by each of the transmission window and the reception window is M ($=2^{lengthofSI}$). Herein, a value recorded in the SI field is within the range of 0 to ($2^{lengthofSI}-1$). Further, it is assumed that both an MSDU having an SI value of ($2^{lengthofSI}-1$) and an MSDU (MSDU (0)) having an SI value of 0 currently exist in the transmission window and the reception window, i.e., the total ($2^{lengthofSI}-1$)+1 number of MSDUs from the MSDU (0) to the MSDU ($2^{lengthofSI}-1$) exist in the transmission window and the reception window.

In this case, when the transmitter stops the transmission of MSDU (0), the transmitter transmits a new MSDU. Herein, the SI of the MSDU to be newly transmitted also has a value of 0. Therefore, it is impossible to distinguish the MSDU whose transmission has been stopped by the transmitter from the MSDU to be newly transmitted. Accordingly, the maximum number of MSDUs which may be managed by each of the transmission window and the reception window is ($2^{lengthofSI}-1$), and the SI value changes from 0 to ($2^{lengthofSI}-1$)−1.

As a result, the first window management scheme harmonizes the number of MSDUs managed by the transmission window with the number of MSDUs managed by the reception window, thereby harmonizing the MSDUs of the transmitter with the MSDUs of the receiver. According to the first window management scheme, the receiver can easily distinguish the MSDUs whose transmission has been stopped by the transmitter, so that waiting time due to incomplete transmission can be minimized.

FIG. 8 is a diagram illustrating an operation for managing windows of the transmitter and the receiver based on a second window management scheme in the data retransmission operation using the FARQ scheme according to an embodiment of the present invention.

Referring to FIG. 8, when the second window management scheme is used, the number of MPDUs managed by the transmission window of the transmitter and the number of MPDUs managed by the reception window of the receiver are always constant. Herein, when the first window management scheme is used, the number of MSDUs managed by the transmission window of the transmitter and the number of MSDUs managed by the reception window of the receiver are always constant. However, when the second window management scheme is used, the number of MPDUs managed by the transmission window of the transmitter and the number of MPDUs managed by the reception window of the receiver are always constant.

For example, when setting up connection between the transmitter and the receiver, if the sizes of the transmission window and the reception window are determined to manage n MPDUs, either the transmission window or the reception window manages the n MPDUs.

In FIG. 8, it is assumed that either the transmission window or the reception window manages six MPDUs. After the transmitter transmits an MPDU corresponding to MSDU (0) to MSDU (4) to the receiver, when MSDU (0) is not normally received in the receiver while the transmission window manages MSDU (0) to MSDU (4), the transmitter stops transmission of the MPDU corresponding to MSDU (0) and moves the transmission window. Then, when the transmitter transmits MPDUs corresponding to MSDU (5) and MSDU (6) after stopping the transmission of the MPDU corresponding to MSDU (0), the transmission window manages six MPDUs from MSDU (1) to MSDU (6). That is, when the first window management scheme is used, the number of MSDUs managed by the transmission window of the transmitter and the number of MSDUs managed by the reception window of the receiver are five. However, when the second window management scheme is used, the number of MPDUs managed by the transmission window of the transmitter and the number of MPDUs managed by the reception window of the receiver may be more than five.

In a case in which the second window management scheme is used, when the number n of MPDUs managed by the transmission window of the transmitter and the number of MPDUs managed by the reception window of the receiver are large enough, transmission is possible with only one MPDU due to the small size of the MSDU, and each of the transmission window and the reception window manages the MSDU (0) to the MSDU ($2^{lengthofSI}-1$), it may also be impossible to acquire sizes satisfying the sizes of the transmission window and the reception window. In this case, as described in the first window management scheme, it is impossible to distinguish the MSDU whose transmission has been stopped by the transmitter from the MSDU to be newly transmitted. Accordingly, the maximum number of MSDUs which may be managed by either the transmission window or the reception window is ($2^{lengthofSI}-2$), and the SI value changes from 0 to ($2^{lengthofSI}-2$)-1. Herein, the second window management scheme manages a constant number of MPDUs instead of MSDUs. However, for the case in which it is impossible to distinguish the MSDU whose transmission has been stopped by the transmitter from the MSDU to be newly transmitted, the maximum number of MSDUs which may be managed by either the transmission window or the reception window is limited to ($2^{lengthofSI}-2$).

As a result, the second window management scheme harmonizes the number of MPDUs managed by the transmission window with the number of MPDUs managed by the reception window, thereby harmonizing the MPDUs of the transmitter with the MPDUs of the receiver. According to the second window management scheme, because it is relatively difficult for the receiver to distinguish the MSDUs whose transmission has been stopped by the transmitter, waiting time due to incomplete transmission may increase as compared with the first window management scheme. However, when SDUs having a relatively small size are frequently generated, multiple SDUs can be simultaneously transmitted. Accordingly, the second window management scheme provides the high efficiency for a window buffer.

Consequently, the first window management scheme and the second window management scheme are used, so that loss of data which may occur due to the use of the FARQ scheme can be solved. Hereinafter, this will be described.

(1) Loss of an MPDU Other than the Initial MPDU or the Last MPDU of an SDU

First, a plurality of incomplete MSDUs may be included in a reception window. Herein, received MPDUs are sequentially queued according to an SI and an SN. In a case in which the reception window has manageable MSDUs with a maximum SN, when an MPDU, which constitutes an MSDU and has a new SI not existing in the reception window, is received, the MPDU is processed according to the first window management scheme and the second window management scheme.

(2) Loss of the Initial MPDU of an SDU

The loss of the initial MPDU of the SDU may be an issue. That is, because the initial MPDU of the corresponding SDU becomes implicit information for reporting a start of a new MSDU, when the initial MPDU constituting the corresponding SDU is lost, a receiver cannot distinguish if MPDUs received after the initial MPDU correspond to redundancy reception of the currently received MPDUs or reception of MPDUs constituting a new MSDU. Herein, when a value recorded in an SI field is used, it is possible to distinguish if the MPDUs are MPDUs included in different MSDUs. Therefore, there never occurs a case in which MPDUs in different MSDUs are mixed and combined.

(3) A Case in which an Additionally Transmitted SDU does not Exist when an Incomplete SDU Exists in a Reception Window A case in which the incomplete SDU exists in the reception window and a new SDU to be transmitted does not exist, if an MAC layer of a transmitter stops transmission of a lost MPDU, the incomplete SDU exists in the reception window while maintaining its incomplete state. In this case, when an MPDU is not additionally received before a preset time period passes on a timer, it is determined that the MPDU is not to be received. Accordingly, the reception window discards the currently received MSDUs or transfers theses MSDUs to an upper layer.

(4) A Case in which an Error has Occurred in ACK or NACK Information in a PHY Layer (ACK and NACK Information Corruption)

When NACK information is determined due to occurrence of the error in the ACK information, the PHY layer of a transmitter retransmits MPDUs to the PHY layer of a receiver. An MAC layer can distinguish if the retransmitted MPDUs are redundant MPDUs by means of an SC field. However, a case in which ACK information is determined due to occurrence of the error in the NACK information in the PHY layer, a correction method does not exist, which is different from a case in which the NACK information is determined due to the occurrence of the error in the ACK information. Therefore, the MSDU received in the receiver does not include some of the MPDUs. Accordingly, the MAC layer of the receiver discards the MSDU or transfers the MSDU to an upper layer.

Actually, in either case where the NACK information is determined due to the occurrence of the error in the ACK information or where the ACK information is determined due to occurrence of the error in the NACK information, does not nearly occur. Accordingly, additional cost, which may occur according to either case may be negligible FIG. 9 is a flow diagram illustrating an interface process between an MAC layer and a PHY layer according to an embodiment of the present invention.

Figure 9:
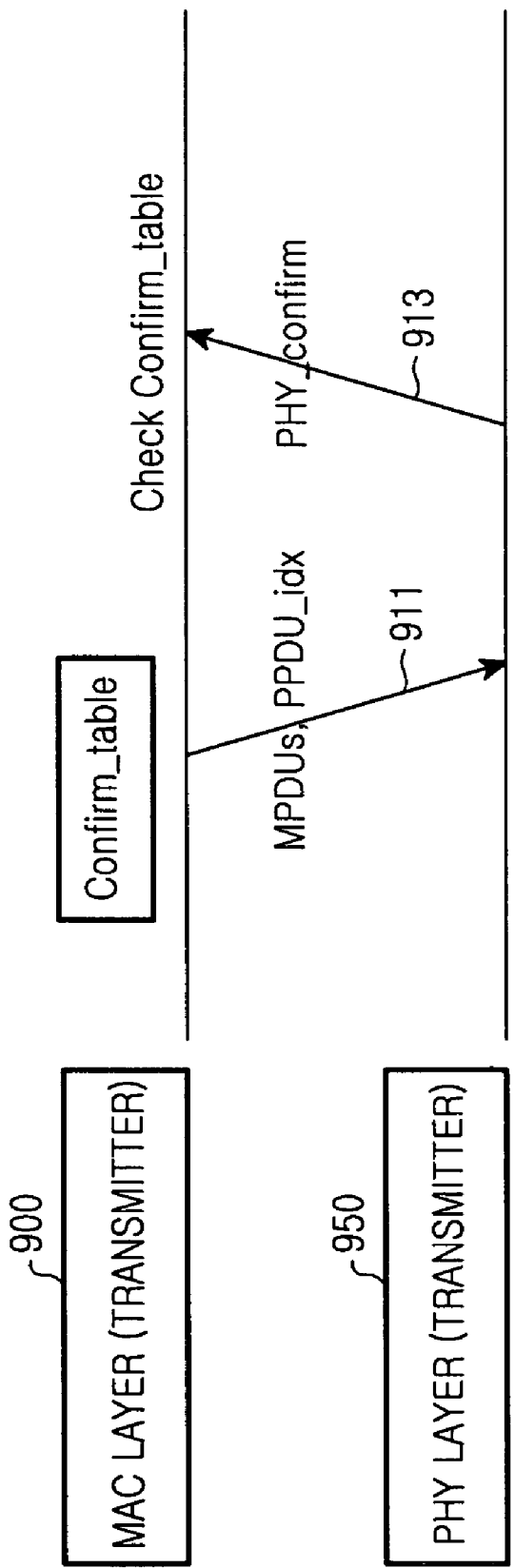
FIG. 9 is a flow diagram illustrating an interface process between an MAC layer and a PHY layer according to an embodiment of the present invention.

Referring to FIG. 9, the MAC layer 900 transfers MPDUs to the PHY layer 950 (911). The MPDUs transferred from the MAC layer 900 are generated as PPDUs in the PHY layer 950. The MAC layer 900 distinguishes the MPDUs by SNs, and manages a set of SNs for the MPDUs transferred to the PHY layer 950. Accordingly, when ACK or NACK information for the PPDUs, or information for failure is received from the PHY layer 950, the MAC layer 900 regards the received information as ACK or NACK information for the MPDU of a corresponding SN.

The MAC layer 900 generates and manages a table Confirm_Table for managing indices for an SN and a PPDU for an MPDU to be transmitted to the PHY layer 950. Hereinafter, the structure of the table will be described.

First, the following elements are defined:

(1) MPDU_elem={n, n+1, n+2}; and (2) PPDU_idx={m}.

When the elements, i.e., the MPDU_elem and the PPDU_idx, are defined, the following table Confirm_Table is generated.

Confirm_Table={MPDU_elem, PPDU_idx}

The MAC layer 900 transfers the MPDU to the PHY layer 950 according to the management sequence in the table Confirm_Table (911). The PHY layer 950 determines if an error has occurred in the MPDU by performing the CRC operation, etc., for the MPDU received from the MAC layer 900, and transmits ACK or NACK information for the corresponding MPDU to the PHY layer 950 according to results from the determination (913). When signals transmitted from the PHY layer 950 to the MAC layer 900 are defined by PHY_Confirm, the signals PHY_Confirm may be expressed as follows.

PHY_Confirm={PPDU_idx, ACK/NACK}

According to the present invention as described above, data retransmission functions independently performed by an MAC layer and a PHY layer through an ARQ scheme and an HARQ scheme, respectively, are integrated to a data retransmission function of an FARQ scheme, so that it is not necessary to continuously transmit/receive a primitive for representing ACK and NACK information according to performance of a retransmission function based on the ARQ scheme in an existing MAC layer. Therefore, it is possible to prevent signaling load due to the continuous transmission/reception of the primitive. Further, because the transmission/reception of the primitive is not necessary, it is also possible to prevent delay time in the signaling. Therefore, it is possible to prevent the entire performance of a mobile communication system from deteriorating due to the delay time. Furthermore, the data retransmission functions independently performed by the MAC layer and the PHY layer, respectively, are integrated to the data retransmission function of the FARQ scheme, so that it is possible to prevent redundant transmission of unnecessary data from occurring.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for retransmitting data in a communication system, the method comprising the steps of:
    transferring to a Physical (PHY) layer of a transmitter by a Medium Access Control (MAC) layer of the transmitter MAC Protocol Data Units (MPDUs), and managing MAC Service Data Units (MSDUs) within a transmission window wherein an MSDU is fragmentable into a plurality of MPDUs;
    transmitting by the PHY layer of the transmitter to a PHY layer of a receiver the MPDUs received from the MAC layer of the transmitter;
    receiving by the PHY layer of the receiver the MPDUs from the PHY layer of the transmitter and transmitting to the PHY layer of the transmitter information representing normal reception or abnormal reception of the received MPDUs;
    notifying by the PHY layer of the transmitter the MAC layer of the transmitter of the normal reception of the MPDUs when the information represents the normal reception of the MPDUs, and retransmitting the MPDUs to the PHY layer of the receiver only when either a number of retransmissions of the MPDUs is less than a preset number of retransmissions or a retransmission time of the MPDUs falls within a preset time period in a case in which the information represents the abnormal reception of the MPDUs;
    deleting by the PHY layer of the transmitter MSDUs, which correspond to MPDUs having not been normally received, from the transmission window until the number of retransmissions of the MPDUs exceeds the preset number of retransmissions or the retransmission time of the MPDUs exceeds the preset time period; and
    transferring by the MAC layer of the transmitter to the PHY layer of the transmitter new MSDUs having a number equal to a number of the deleted MSDUs, and managing the new MSDUs within the transmission windows,
    transferring, by the PRY layer of the receiver, the MPDUs to a MAC layer of the receiver, the MPDUs being received from the PHY layer of the transmitter;
    converting by the MAC layer of the receiver the MPDUS received from the PHY layer of the receiver to MSDUs, and managing the converted MSDUs within a reception window for managing MSDUs having a number equal to a number of the MSDUs managed by the transmission window; and
    deleting by the MAC layer of the receiver a first MSDU within the reception window by a number of MSDUs corresponding to the new MPDUs, when the MAC layer of the receiver receives new MPDUs from the PHY layer of the receiver while managing the MSDUs within the reception window.

2. The method as claimed in claim 1, wherein the MPDU includes a field representing an identifier of flow having been set up between the transmitter and the receiver, a field representing a corresponding MSDU is a last MPDU of fragmented MPDUs, a field representing an index of an MSDU fragmented into the MPDU, and a field representing a sequence number of the MPDU.

3. The method as claimed in claim 1, wherein a Physical Protocol Data Unit (PPDU) is generated by multiplexing the MPDUs.

4. The method as claimed in claim 1, wherein the MPDUs correspond to a preset number of MSDUs.

5. The method as claimed in claim 1, wherein the MSDUs correspond to a preset number of the MPDUs.

6. An apparatus for retransmitting data in a communication system, the apparatus comprising:
    a Medium Access Control (MAC) layer of a transmitter for transferring to a Physical (PHY) layer of the transmitter MAC Protocol Data Units (MPDUs), and managing MAC Service Data Units (MSDUs) within a transmission window, wherein an MSDU is fragmentable into a plurality of MPDUs;
    the PHY layer of the transmitter for transmitting to a PHY layer of a receiver the MPDUs received from the MAC layer of the transmitter, notifying the MAC layer of the transmitter of normal reception of the MPDUs when information received from the PHY layer of the receiver represents the normal reception of the MPDUs, the information representing the normal reception or abnormal reception of the MPDUs, retransmitting the MPDUs to the PHY layer of the receiver only when either a number of retransmissions of the MPDUs is less than a preset number of retransmissions or a retransmission time of the MPDUs falls within a preset time period in a case in which the information represents the abnormal reception of the MPDUs, deleting MSDUs, which corresponds to MPDUs having not been normally received, from the transmission window until the number of retransmissions of the MPDUs exceeds the preset number of retransmissions or the retransmission time of the MPDUs exceeds the preset time period, transferring to the PHY layer of the transmitter new MSDUs having a number equal to a number of the deleted MSDUs, and managing the new MSDUs within the transmission window; and
    the PHY layer of the receiver for receiving the MPDUs from the PHY layer of the transmitter and transmitting to the PHY layer of the transmitter the information representing the normal reception or the abnormal reception of the MPDUs,
    wherein the PHY layer of the receiver transfers the MPDUs to a MAC layer of the receiver, the MPDUs being received from the PHY layer of the transmitter, and
    wherein the MAC layer of the receiver converts the MPDUs received from the PHY layer of the receiver into MSDUs, manages the converted MSDUs within a reception window for managing MSDUs having a number equal to a number of the MSDUs managed by the transmission window, and deletes a first MSDU within the reception window by a number of MSDUs corresponding to new MPDUs, when the MAC layer of the receiver receives the new MPDUs from the PHY layer of the receiver while managing the MSDUs within the reception window.

7. The apparatus as claimed in claim 6, wherein the MPDU includes a field representing an identifier of flow having been set up between the transmitter and the receiver, a field representing a corresponding MSDU is a last MPDU of fragmented MPDUs, a field representing an index of an MSDU fragmented into the MPDU, and a field representing a sequence number of the MPDU.

8. The apparatus as claimed in claim 6, wherein a Physical Protocol Data Unit (PPDU) is generated by multiplexing the MPDUs.

9. The apparatus as claimed in claim 6, wherein the MPDUs correspond to a preset number of MSDUs.

10. The apparatus as claimed in claim 6, wherein the MSDUs correspond to a preset number of MPDUs.

* * * * *